(12) United States Patent
Hammer

(10) Patent No.: US 6,891,983 B2
(45) Date of Patent: May 10, 2005

(54) WAVELENGTH FILTER AND POLARIZER

(75) Inventor: Jacob Meyer Hammer, Annapolis, MD (US)

(73) Assignee: Photodigm, Inc., Richardson, TX (US)

( * ) Notice: Subject to any disclaimer, the term of this patent is extended or adjusted under 35 U.S.C. 154(b) by 147 days.

(21) Appl. No.: 10/307,612

(22) Filed: Dec. 2, 2002

(65) Prior Publication Data

US 2004/0105606 A1 Jun. 3, 2004

(51) Int. Cl.[7] .............................................. G02B 6/00
(52) U.S. Cl. ........................................................ 385/11
(58) Field of Search ............................. 385/11, 129, 41, 385/131; 359/483, 484

(56) References Cited

U.S. PATENT DOCUMENTS

| | | | | |
|---|---|---|---|---|
| 4,672,196 A | * | 6/1987 | Canino | 250/225 |
| 5,185,831 A | * | 2/1993 | Kawashima | 385/41 |
| 5,469,519 A | * | 11/1995 | Chang et al. | 385/33 |
| 6,459,829 B1 | * | 10/2002 | Yamauchi et al. | 385/24 |

* cited by examiner

Primary Examiner—Michael G. Lee
Assistant Examiner—Jamara A. Franklin
(74) Attorney, Agent, or Firm—Duke W. Yee; Gerald H. Glanzman; Christopher P. O'Hagan

(57) ABSTRACT

A band-stop wavelength filter and TE-TM mode selector made using an absorptive layer on an optical waveguide is provided. At the correct thickness, refractive index, absorptive loss, and location of the absorptive layer, a relatively high fraction of guided-mode intensity flows in the absorptive layer for one polarization mode. A much smaller fraction flows for the perpendicular polarization mode and for wavelengths on both sides of the design center. The result is a broad-band-stop filter for the selected polarization mode. This device is capable of strong discrimination between TE and TM modes over a very broad bandwidth.

23 Claims, 6 Drawing Sheets

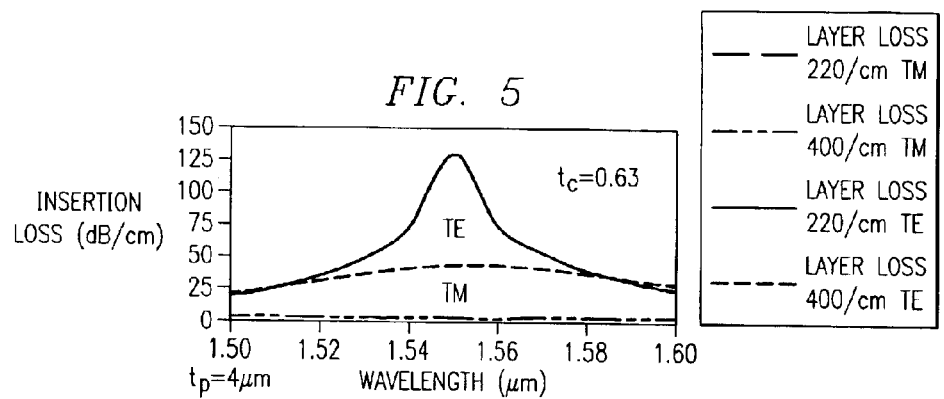
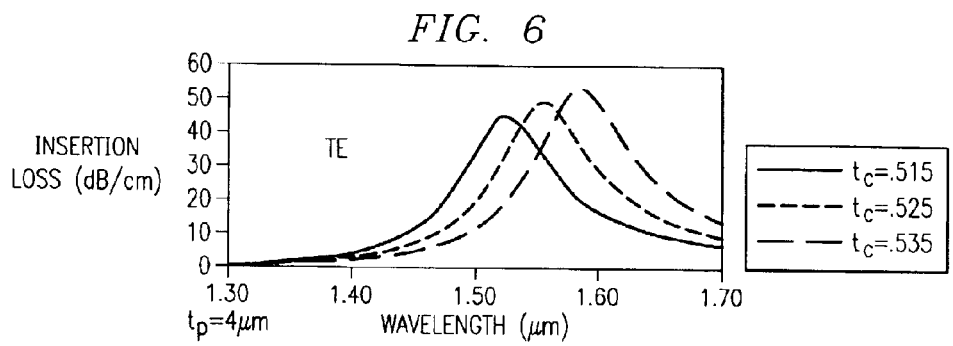
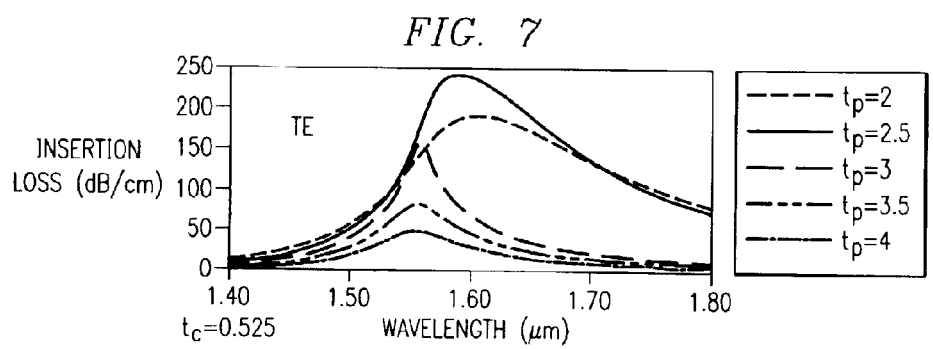

WAVELENGTH FILTER AND POLARIZER

1. Technical Field

The present invention relates generally to lasers, and more specifically to a method for selectively filtering specific light polarizations in an optical waveguide.

2. Description of the Related Art

Unpolarized light consists of wave vibrations in many directions perpendicular to the direction of travel. Polarizers filter out or block all vibrations, except those desired. Laser light can propagate along a waveguide in various ways. Two common modes of propagation are transverse-magnetic (TM) and transverse-electric (TE). In TM mode, the magnetic lines of flux are perpendicular to the axis of the waveguide. In TE mode, the electric lines of flux are perpendicular to the axis of the waveguide.

Polarizers are used as building blocks of optical waveguide devices. TM- and TE-pass polarizers are used to filter out one polarization component propagating in an optical waveform. Integrated polarizers must be compatible with the specific waveguiding structure.

Typically, the basic structure of a TE-pass polarizer consists of a sandwich layer system on top of the waveguide structure. This layer might be formed from a dielectric layer (e.g., yttrium oxide) followed by an absorbing metallic layer (e.g., aluminum). As a result, TM-polarized light is coupled to surface plasmons of the metallic layer and absorbed. By contrast, TE polarized light is not strongly influenced by the layer system.

TM-pass polarizers are typically fabricated using the proton exchange technique in lithium niobate. In this technique, lithium ions are substituted by hydrogen ions. TM-pass polarizers are obtained by using proton-exchanged areas beside the waveguide. As a result, TE waves couple into the exchanged areas, whereas the TM waves remain in the optical waveguide.

As described above, typical TE polarizers rely on the use of a highly absorptive metal film. These work by preferentially absorbing TM light. They cannot be converted to absorb TE modes in any simple, cost-effective way. Separate materials and configurations are necessary for the TE absorption. In addition, current polarizers have very high absorption values.

Therefore, it would be desirable to have a method for achieving efficient TM and TE polarization that does not directly depend on the material deposited on the optical waveguide.

SUMMARY OF THE INVENTION

The present invention provides a band-stop wavelength filter and TE-TM mode selector made using an absorptive layer on an optical waveguide. At the correct thickness, refractive index, absorptive loss, and location of the absorptive layer, a relatively high fraction of guided-mode intensity flows in the absorptive layer for one polarization mode. A much smaller fraction flows for the perpendicular polarization mode and for wavelengths on both sides of the design center. The result is a broad-band-stop filter for the selected polarization mode. This device is capable of strong discrimination between TE and TM modes over a very broad bandwidth.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts the insertion loss as a function of wavelength for two values of $\alpha$ in accordance with the present invention;

FIG. 6 depicts a graph illustrating the results for fundamental TE mode operation ($TE_0$) in accordance with the present invention;

FIG. 7 depicts a graph illustrating absorption patterns for different thickness of the waveguide cover layer in accordance with the present invention;

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The present invention provides a method for obtaining an efficient polarizer on optical waveguide devices. The method does not directly depend on the material used. It teaches that in any planar or two-dimensional optical waveguide device, a polarizer may be obtained by depositing a loss layer as the topmost or outermost layer. After the loss layer is deposited, additional layers of low refractive index may be deposited to cover the loss layer. The term "loss layer" refers to a layer of material that has a specified value of the refractive index and a specified value of optical absorption. This is also referred to as a specified complex refractive index. The loss layer can be of any convenient material that has the desired value of complex refractive index and can be deposited on the waveguide material. The loss layer can be made from amorphous or polycrystalline materials.

Figure 1:
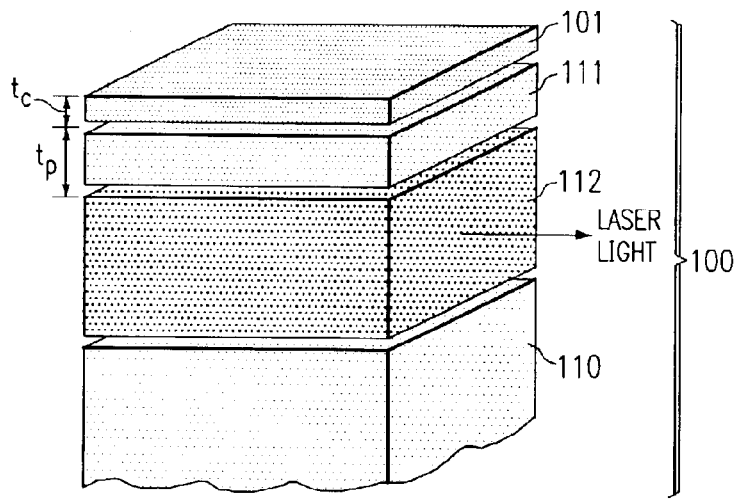
FIG. 1 depicts a diagram illustrating a band-stop wavelength filter and Transverse Electric-Transverse Magnetic (TE-TM) mode selector in accordance with the present invention.

Referring now to FIG. 1, a diagram illustrating a band-stop wavelength filter and Transverse Electric-Transverse Magnetic (TE-TM) mode selector is depicted in accordance with the present invention. This wavelength filter/mode selector is constructed by depositing an absorptive loss layer 101 onto an optical waveguide 100. The present invention uses a planar waveguide 100 comprising a substrate 110 made of the same material as the cover layer 111 of the filter device. The cover layer 111 is also known as the cladding or p-clad when associated with semiconductor amplifier waveguides. The invention also comprises a guiding layer (or layers) 112 (frequently called film), and air or vacuum as the layer bounding the loss layer. The thickness and refractive index of the loss layer 101 are critical parameters that have not previously been recognized in the prior art. This thickness and refractive index are chosen so that there is a substantial secondary peak of the optical field in the loss layer. The refractive index should be equal to or higher than that of the cover 111. In this case, at the correct thickness, a relatively high fraction of guided-mode intensity flows in the absorptive layer for one polarization mode (e.g., TE) and a much smaller fraction for the perpendicular polarization mode (i.e. TM).

A first embodiment of the invention uses a simple inline filter on a low refractive index fiber-like waveguide. An absorptive (loss) layer 101 consisting of Poly(methyl methacrylate) (PMMA), containing a dye which has modest absorption in the 1.55 $\mu$m wavelength region, is deposited on the cover layer 111 of the wavelength as illustrated in FIG. 1.

Table 1 lists the layers forming the optical-waveguide filter in accordance with the first embodiment of the present invention.

TABLE 1

Center Wavelength 1.55 $\mu$m

| Material | Loss, α/cm | Refractive index, n | Thickness/$\mu$m |
|---|---|---|---|
| Air | 0 | 1 | — |
| Absorptive layer PMMA with dye | 2 × 10² | 1.54 | TE $t_c$ = 0.63, h = 0.619 TM $t_c$ = 0.76, h = 0.714 |
| Quartz (p-) clad | 0.0 | 1.447 | $t_p$ = 4 |
| Doped quartz core | 0.0 | 1.452 | thickness = 10 |
| Quartz substrate | 0.0 | 1.447 | — |

This embodiment is based on layers of quartz and doped quartz. These materials are similar to those used in fiber-optic waveguides and will allow good coupling to optical fibers. The dye concentration for this example is selected so that the absorption coefficient ($\alpha$) in the 1.4–1.7 $\mu$m wavelength range is 2×10²/cm. Other values of absorption may be used.

The loss layer thickness ($t_c$), shown in Table 1, is optimum for the center wavelength. For each polarization mode, $t_c$ is found to be slightly larger than the cutoff thickness (h) of such a layer calculated as described above. The cut-off thickness' h=0.619 (TE) and h=0.714 (TM) give $t_c/h$ ratios of 1.02 for TE mode and 1.06 for TM.

Figure 2A:
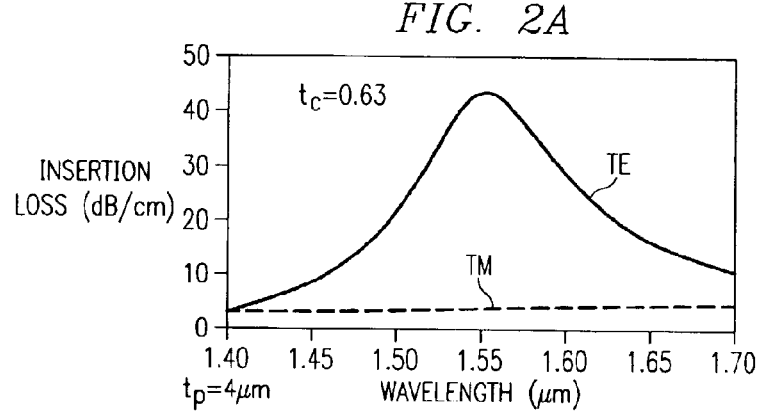
FIGS. 2A and 2B depict graphs illustrating mode filter discrimination based on loss layer thickness in accordance with the present invention.
Figure 2B:
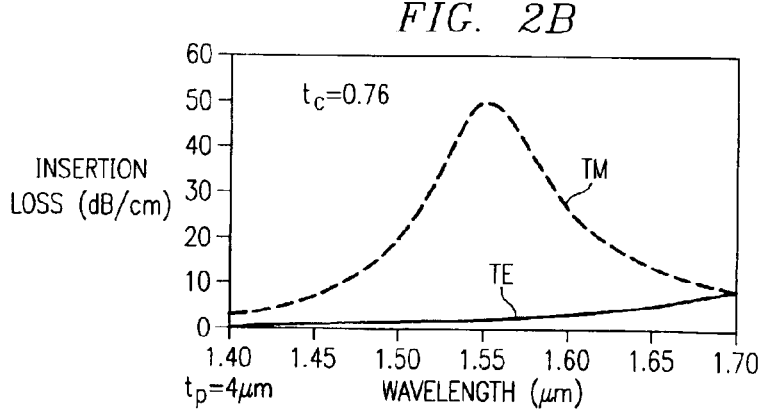

Referring now to FIGS. 2A and 2B, graphs illustrating mode filter discrimination based on loss layer thickness are depicted in accordance with the present invention. FIG. 2A shows a plot of the insertion loss for both the $TE_0$ and $TM_0$ modes as a function of wavelength for $t_c$=0.63 $\mu$m. The strong absorption of the TE mode and the weak absorption of the TM mode is the behavior of an ideal TE mode filter. FIG. 2B depicts a similar plot for $t_c$=0.76 $\mu$m, which comprises a TM filter. The secondary peak and resulting loss slowly falls for wavelengths to either side of the design center. The loss for the perpendicular polarization mode is little changed. The result is a broadband-stop filter for the selected polarization mode. In other words, the device is capable of strong discrimination between TE and TM modes over a very broad bandwidth and is thus ideal for use as a TE or TM mode filter.

Figure 3A:
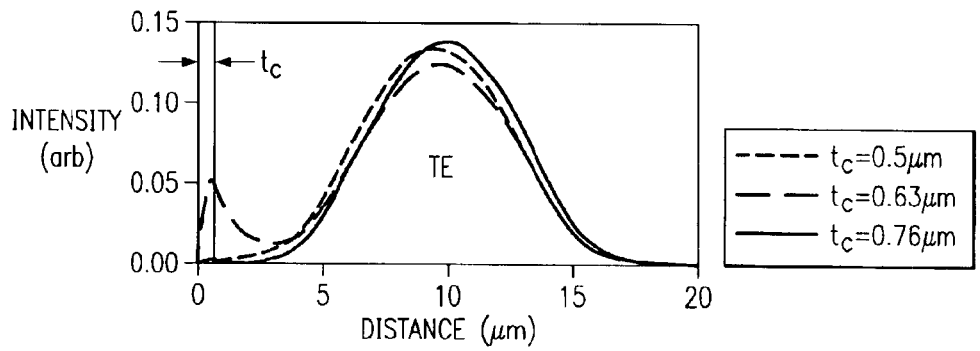
FIGS. 3A and 3B depict graphs illustrating the secondary peaks of the optical field in the loss layer in accordance with the present invention.
Figure 3B:
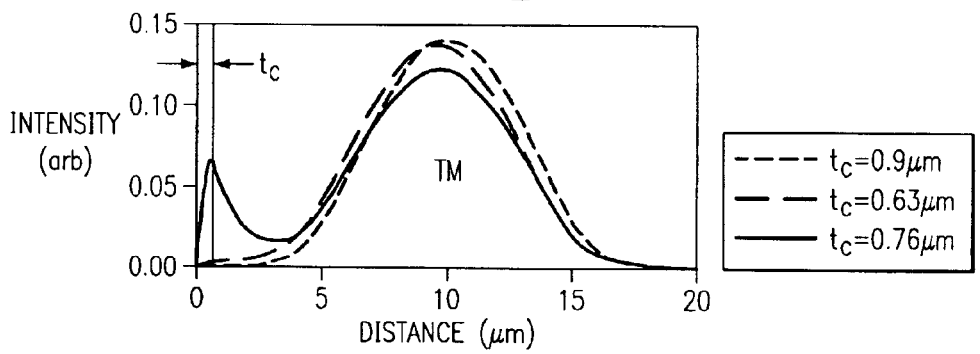

Referring to FIGS. 3A and 3B, graphs illustrating the secondary peaks of the optical field in the loss layer are depicted in accordance with the present invention. The secondary peaks are indicated by the near-field-intensity plots of FIGS. 3A and 3B. The real part of the complex refractive index of the loss layer is equal to or greater than that of the cover layer on which the loss layer is deposited. The values shown in FIGS. 3A and 3B are for the first embodiment, in which the real part of the refractive index is 1.54 and the cover is 1.447.

In FIG. 3A, near-field intensities for the lowest order TE mode are plotted. A strong secondary peak in the loss layer occurs at the optimum-loss-layer thickness $t_c$=0.631 $\mu$m. Here, maximum absorption of the lowest order TE mode takes place. Little or no secondary peak is observed for $t_c$=0.5 $\mu$m, which is below the TE cutoff thickness (h), nor at $t_c$=0.76 $\mu$m, which is the optimum thickness to absorb the lowest order TM mode.

In FIG. 3B, near field intensities for the lowest order TM mode are plotted. A strong secondary peak in the loss layer occurs at the optimum loss layer thickness of $t_c$=0.76 $\mu$m. Here maximum absorption of the lowest order TM mode takes place. Little or no secondary peak is observed for $t_c$=0.63 $\mu$m. Though this is the optimum thickness to absorb the TE mode, it is below the cutoff thickness (h) for the TM mode. Similarly, no secondary peak is observed at $t_c$=0.9 $\mu$m, which is well above the TM optimum.

Therefore, at $t_c$=0.63 $\mu$m, the TM mode is passed, while the TE is absorbed. At $t_c$=0.76 $\mu$m, the TE mode is passed, while the TM is absorbed. The second peak occurs only in a limited-absorptive-layer thickness range, i.e. it passes through a maximum as the thickness is increased. If a loss-less film with a refractive index equal to that of the real part of the complex replaces the loss film, a secondary peak would be obtained that grows monotonically with film thickness.

Similar behavior is found for all embodiments of the present invention. The importance, and perhaps even the existence, of the secondary peak has not been recognized in the prior art. The present invention involves determining the correct thickness of a loss layer applied as the outermost layer of an optical waveguide in order that there be a substantial, but secondary, peak of field intensity in the loss layer. A secondary peak increases the value of the loss-layer-confinement factor and results in increased loss as compared to cases where the mode does not have any substantial secondary peak in the loss layer. In addition, significant secondary peaks occur only for a limited range of absorption values. This range is two to three orders of magnitude lower than the absorption provided by metal films.

In the remaining description below, the lowest order waveguide modes are assumed, unless otherwise specified. $TE_0$ and $TM_0$ denote the lowest-order modes of planar-optical waveguides. Unless otherwise specified, the notation TE and TM are equivalent to $TE_0$ and $TM_0$, respectively.

For the waveguide, the cutoff thickness, h, of the lowest order mode is determined by the formula:

$$h=[(\lambda/2\pi)/(n_f^2-n_s^2)^{+e,fra} 1/2+ee ]\text{Arc Tan}(a)^{+e,fra} 1/2+ee$$

The variable "a" is given by:

$$a=a_{(TE)}=(n_s^2-1)/(n_f^2-n_s^2) \text{ for TE modes, and}$$

$$a=a_{(TM)}=a_{(TE)}n_f^4 \text{ for TM modes}$$

The variable $n_f$ is the real part of the refractive index of the loss layer, which is used as the guiding layer for the cutoff calculation. The variable ns is the refractive index of the cover layer of the filter, which serves as the substrate for the cutoff calculation.

The optimum thickness is found in the range of h to 2h by calculating the confinement factor of the loss layer ($\Gamma$) as a function of $t_c$ for the wavelength and polarization mode that is to be stopped. This may be done using well-known analytic means, e.g., MODEIG. The $t_c$ value at which $\Gamma$ is maximized is the optimum thickness to be used for the filter. In performing the calculation, one must avoid solutions where the loss layer becomes the principal guiding layer.

The thickness of the clad, $t_p$, is chosen to give a desired value of modal loss. In general, $t_p$ should be chosen so that $\Gamma$ is less than 0.05, which implies that less than 5% of the field is in the loss layer. Over a modest range, the center wavelength may be tuned by changing the thickness of the loss layer.

The magnitude of the absorptive layer loss is another important parameter that can be specified to obtain optimum polarizer action. The discrimination between polarizations is optimized at a particular value of absorptive layer loss. Furthermore, the width of the wavelength response and the sensitivity to absorptive layer thickness can be selected over a relatively wide range by choosing higher or lower loss than optimum. This property allows a choice of the band-stop width and an easing of manufacturing tolerances. These principles apply to all embodiments of the present invention.

The symbol $\alpha$ represents the power loss of the absorptive layer and is frequently called the extinction coefficient. The variation of insertion loss with wavelength is frequently called the band-stop characteristic.

Figure 4:
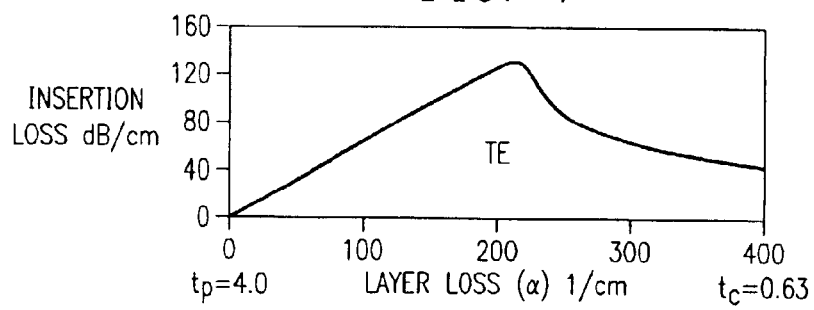
FIG. 4 depicts a graph illustrating insertion loss as a function of the layer loss, $\alpha$, for the TE Mode in accordance with the present invention.

FIG. 4 depicts a graph illustrating insertion loss as a function of the layer loss, $\alpha$, for the TE Mode in accordance with the present invention. The layer loss, $\alpha$, is varied from 0 to 400/cm. As can be seen, the insertion loss rises slowly to a peak at $\alpha=220$/cm and falls more rapidly for larger values. Thus, one can optimize the performance by choosing the correct value of $\alpha$.

FIG. 5 depicts the insertion loss as a function of wavelength for two values of $\alpha$. As can be seen, at $\alpha=220$/cm the response is rather sharp and has a high TE insertion loss. At $\alpha=400$/cm the response is broad and has reduced TE insertion loss. The TM insertion loss is very low and broad so that a good stop-band filter to allow TM (TM polarizer) to pass and prevent TE from passing is obtained. Similar results for TM stop-band filter (TE polarizer) are obtained. Thus for TE or TM mode polarizers, the layer loss can be selected in the range from 50/cm to 400/cm to give the desired stop-band width and peak value of insertion loss to suit the need of the application.

A second embodiment of the present invention uses the same basic waveguide structure as the first embodiment, depicted in FIG. 1. However, the loss layer consists of a composite of metal particles suspended in host material. A low concentration of loss particles (e.g., gold, graphite, iron) in a loss free host material may be used. In this example PMMA is the host and iron particles provide the loss. Composites using carbon or other loss materials, and many other plastic host materials, may also be used and would behave similarly.

The fill factor is the volume fraction of particles and is chosen to be 0.01 for this case. Other fractions can be used. The loss of the composite is calculated as described in K. Baba, F. Takase, M. Miyagi "Ferromagnetic particle composite polymer films for glass and semiconductor substrates", Optics Communications, 139, 35–38 15 Jun. 1997. For this calculation the loss of the particles is assumed to be the same as the loss in the bulk material. No loss reduction factor, as has been described for nanometer sized particles, is assumed. The layers forming the optical-waveguide filter of the second embodiment are listed in Table 2.

TABLE 2

Center Wavelength 1.55 μm TE modes

| Material | Loss, α/cm | Refractive index, n | Thickness/μm |
|---|---|---|---|
| Air | 0 | 1 | — |
| Absorptive layer Iron PMMA composite | $2.151 \times 10^2$ | 1.5645 | $t_c = 0.515$, 0.525, (h = 0.522) 0.535 |
| Quartz (p-) clad | 0.0 | 1.447 | $t_p = 4.0, 3.5, 3.0, 2.5, 2.0$ |
| Ge doped quartz core | 0.0 | 1.452 | 10 |
| Quartz substrate | 0.0 | 1.447 | — |

This embodiment is also based on layers of quartz and doped quartz. These materials are similar to those used in fiber-optic waveguides, and will thus allow good coupling to optical fibers. The TE cut-off thickness is h=0.522, giving a $t_c/h$ ratio of 1.01.

FIG. 6 depicts a graph illustrating the results for fundamental TE mode operation ($TE_0$) in accordance with the present invention. Curves for composite thickness' $t_c=0.515$, 0.525 and 0.535 μm are shown. The p-clad thickness $t_p=4$ μm. At the center wavelength of 1.55 μm $t_c=0.525$ μm and the cut-off thickness h=0.522 μm. A shift to longer wavelengths may be observed as the thickness is increased.

FIG. 7 depicts a graph illustrating absorption patterns for different thickness of the waveguide cover layer in accordance with the present invention. In this example, $t_c$ is held constant at 0.525 μm. The five curves show the results as $t_p$ is stepped down from 4 to 2 μm. For $t_p=3$ and greater, the peak wavelength is fixed ≈1.55 μm and the absorption increases with decreasing $t_p$. As $t_p$ becomes less than ≈3 μm, the wavelength is shifted, the response broadened, and the absorption increased.

A third embodiment of the present invention is based on a multi-quantum-well waveguide, such as might be used to make lasers or amplifiers. The waveguide is grown in the quaternary system frequently used to make lasers for operation in the 1.55 μm region. The absorptive layer is the quaternary compound $Ga_{0.27}In_{0.73}As_{0.57}P_{0.43}$, which can be grown on an InP p-clad Layer. The compound is chosen to have a refractive index of 3.4, and doped to have absorption $\alpha=2\times10^2$/cm. The layer structure is shown in Table 3 below.

The filter structure may be visualized using FIG. 1. The waveguide film consists of all the layers from the Top Barrier to the p-clad. The Cover is the p-clad and the substrate remains the substrate. This filter can be made on the same substrate and in line with a laser or amplifier by adding the absorptive layer after removing any conductive cap layers and contacts and adjusting the p-clad thickness as needed. The cut-off thickness is h=0.27 (TE) and 0.31 (TM), giving respective $t_c/h$ ratios of 1.26 TE, 1.31 TM.

TABLE 3

Center Wavelength 1.55 $\mu$m

| Material | Loss, α/cm | Refractive index, n | Thickness/$\mu$m |
|---|---|---|---|
| Air | 0.0 | 1 | — |
| Absorptive Layer $Ga_{0.27}In_{0.73}As_{0.64}P_{0.36}$ | $2 \times 10^2$ | 3.4 | $t_c = 0.34$, h = 0.27 TE $t_c = 0.405$, h = 0.31 TM |
| p-clad, InP | 0.0 | 3.1628 | $t_p = 3$ |
| Top Barrier, $Ga_{0.27}In_{0.73}As_{0.57}P_{0.43}$ | 0.0 | 3.3720 | 0.05 |
| QW, $Ga_{0.27}In_{0.73}As_{0.8}P_{0.2}$ | 0.0 | 3.4600 | 0.01 |
| Barrier, $Ga_{0.27}In_{0.73}As_{0.57}P_{0.43}$ | 0.0 | 3.3720 | 0.05 |
| QW, $Ga_{0.27}In_{0.73}As_{0.8}P_{0.2}$ | 0.0 | 3.4600 | 0.01 |
| Barrier, $Ga_{0.27}In_{0.73}As_{0.57}P_{0.43}$ | 0.0 | 3.3720 | 0.05 |
| QW, $Ga_{0.27}In_{0.73}As_{0.8}P_{0.2}$ | 0.0 | 3.4600 | 0.01 |
| Barrier, $Ga_{0.27}In_{0.73}As_{0.57}P_{0.43}$ | 0.0 | 3.3720 | 0.05 |
| QW, $Ga_{0.27}In_{0.73}As_{0.8}P_{0.2}$ | 0.0 | 3.4600 | 0.01 |
| Barrier, $Ga_{0.27}In_{0.73}As_{0.57}P_{0.43}$ | 0.0 | 3.3720 | 0.05 |
| n-clad, InP | 0.0 | 3.1628 | 0.50 |
| substrate InP | 0.0 | 3.1628 | — |

Figure 8A:
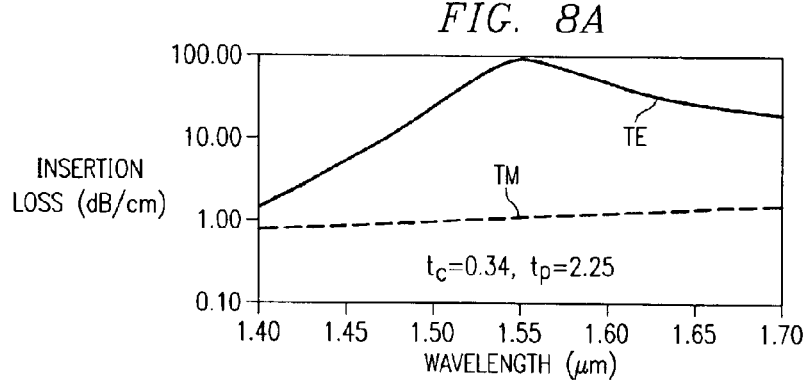
FIGS. 8A and 8B depict graphs illustrating the band stop characteristics of the multi-quantum-well waveguide embodiment in accordance with the present invention.
Figure 8B:
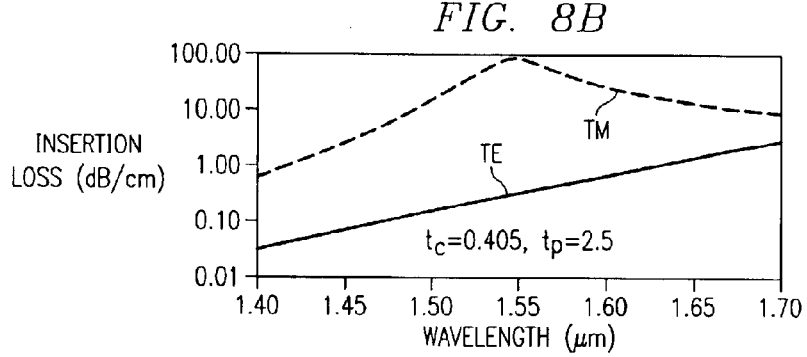

Referring to FIGS. 8A and 8B, graphs illustrating the band stop characteristics of the multi-quantum-well waveguide embodiment are depicted in accordance with the present invention. FIG. 8A shows results for absorptive layer thickness $t_c$=0.34 $\mu$m and a p-clad thickness of 2.25 $\mu$m. The TE loss is ≈100 dB/cm, with a TM loss of only 1 dB/cm, at the center wavelength of 1.55 $\mu$m. Thus, this produces a filter for selecting the TM modes while rejecting the TE mode.

In FIG. 8B, the $TM_0$ results shown are for a composite thickness of 0.405 and p-clad thickness of 2.5 $\mu$m. Here the TM mode is stopped with a loss ≈100 dB/cm and the TE mode is passed with less than 0.5 dB/cm of loss. In both cases a useful band centered on 1.55 is available.

Figure 9:
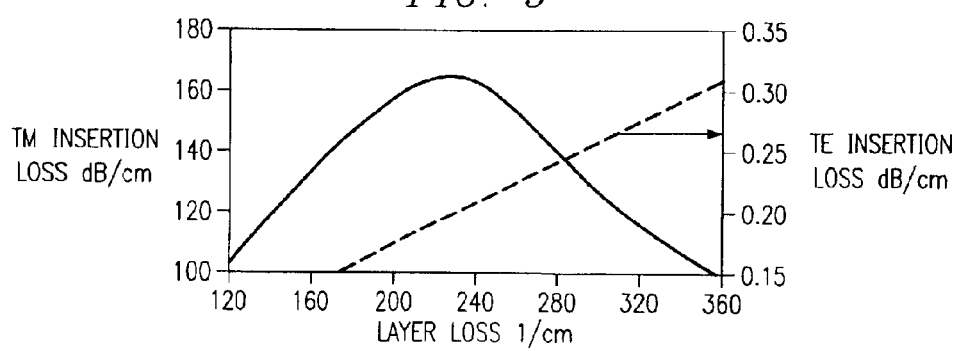
FIG. 9 depicts a graph illustrating insertion loss as a function of layer loss for the third embodiment in accordance with the present invention.

Referring to FIG. 9, a graph illustrating insertion loss as a function of layer loss for the third embodiment is depicted in accordance with the present invention. Here the TM mode loss peaks at layer loss ≈230/cm and falls off on both sides. This is similar behavior to that observed for the first embodiment. As would be expected, the TE loss varies monotonically with layer loss and is below 0.3 dB/cm over the entire range. Thus good TE Polarizer behavior is found. Similar behavior is observed for the TM polarizer case.

Figure 10:
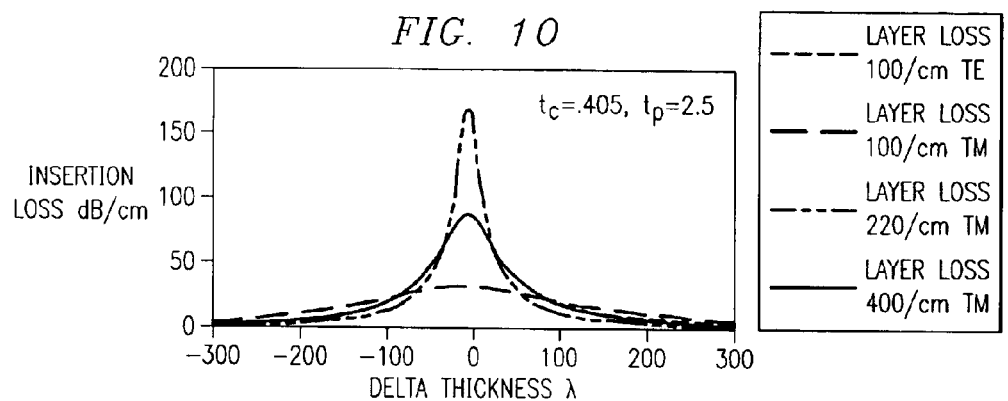
FIG. 10 depicts a graph illustrating the insertion loss as a function of the departure of loss layer thickness from its optimum value, with layer loss as a parameter.

FIG. 10 depicts a graph illustrating the insertion loss as a function of the departure of $t_c$ from its optimum value, Delta thickness, with □ as a parameter. $t_c$=0.405 is the optimum value for a TE polarizer. The insertion loss' for the TM modes for layer loss □=50, 220, and 400/cm are plotted. The insertion loss for the TE mode at □=50/cm is also shown. Note that there is low absorption for the TE modes at all values of □ in this case. For the TM modes the insertion loss vs Delta thickness is sharpest at 220/cm and broadens as the layer loss is lowered or raised. Therefore, there is a trade off between the peak absorption and the sensitivity to thickness variation that is mediated by the value of layer loss □. This has implications in setting manufacturing tolerances. It may, for example, be desirable to have less absorption to ease the tolerance on the thickness of the absorptive layer.

In addition, the loss layer can be covered with a layer or several layers of lower refractive index without changing the basic operation of the filter. This allows the loss layer to be protected, if desired, by covering layers. The covering layers should have no significant optical absorption and have a refractive index that is substantially lower than the real part of the complex refractive index of the loss layer. This principle applies to all embodiments of the present invention.

For example, the loss layer may be covered with a layer of quartz, which may be deposited by any well-known method. The quartz has a refractive index of 1.447 and substantially no loss. The real part of the refractive index of the loss layer is 3.372. At a loss layer thickness of 0.433 $\mu$m, the insertion loss for the TM mode is calculated to be 221 dB/cm while the insertion loss for the TE mode is 0.33 dB/cm. This structure results in an efficient TE Polarizer. This behavior is similar to the behavior of the Polarizers without a covering layer, allowing the addition of a low-index covering layer without losing desired characteristics. Similar behavior is exhibited with a thick covering layer. Additional layers on top of a thick-low-index covering layer will have no deleterious effect on the operation of the present invention.

A fourth embodiment of the present invention is based on a multi-quantum-well waveguide, such as might be used to make lasers or amplifiers for operation in the 1.3 $\mu$m region. The waveguide is grown in the AlGaInAs quaternary system. The absorptive layer is a composite of Iron in a GaAs host. The volume fill fraction of the iron (q) is 0.02. As with the other embodiments, this filter may be visualized using FIG. 1. The waveguide film would consists of all the layers from the Top GRIN to the n-clad. The Cover is the p-clad and the substrate is the n-substrate. The acronym GRIN refers to steps in a graded refractive index transition, as is well known in the art.

The composite is calculated to have refractive index of 3.445 and loss α of $1.268 \times 10^2$/cm. The layer structure is shown in Table 4. The cut-off thickness is h=0.245 (TE) and 0.271 (TM), giving respective $t_c/h$ ratios of 1.08 TE, 1.19 TM.

This filter can be made on the same substrate and in line with a laser or amplifier by adding the absorptive layer after removing any conductive cap layers and contacts and adjusting the p-clad thickness as needed.

TABLE 4

Center Wavelength 1.31 $\mu$m

| Material | Loss, α/cm | Refractive index, n | Thickness/$\mu$m |
|---|---|---|---|
| Air | 0.00 | 1.0000 | — |
| GaAs-Fe Composite q = 0.02 | $1.268 \times 10^2$ | 3.445 | tc = 0.265, h = 0.245 TE tc = 0.322, h = 0.271 TM |
| p-clad AlInAs | 0.0 | 3.2310 | 3 |
| Top GRIN | 0.0 | 3.2310 | 0.02 |
| GRIN | 0.0 | 3.29353 | 0.02 |
| GRIN | 0.0 | 3.33042 | 0.02 |
| barrier, AlGaInAs | 0.0 | 3.3728 | 0.02 |

TABLE 4-continued

Center Wavelength 1.31 μm

| Material | Loss, α/cm | Refractive index, n | Thickness/μm |
|---|---|---|---|
| QW | 0.0 | 3.485 | 0.005 |
| barrier, AlGaInAs | 0.0 | 3.3728 | 0.01 |
| QW | 0.0 | 3.485 | 0.005 |
| barrier, AlGaInAs | 0.0 | 3.3728 | 0.01 |
| QW | 0.0 | 3.485 | 0.005 |
| barrier, AlGaInAs | 0.0 | 3.3728 | 0.01 |
| QW | 0.0 | 3.485 | 0.005 |
| barrier, AlGaInAs | 0.0 | 3.3728 | 0.01 |
| QW | 0.0 | 3.485 | 0.005 |
| GRIN | 0.0 | 3.3728 | 0.02 |
| GRIN | 0.0 | 3.33042 | 0.02 |
| GRIN | 0.0 | 3.29353 | 0.02 |
| GRIN | 0.0 | 3.26070 | 0.02 |
| GRIN AlGaInAs | 0.0 | 3.2310 | 0.02 |
| Inner n-cladding AlInAs | 0.0 | 3.2310 | 0.11 |
| GRIN n-transition | 0.0 | 3.2310 | 0.0025 |
| GRIN n-transition | 0.0 | 3.2432 | 0.0025 |
| GRIN n-transition | 0.0 | 3.2558 | 0.0025 |
| Bottom GRIN n-transition | 0.0 | 3.2689 | 0.0025 |
| n-substrate InP | 0.0 | 3.1987 | — |

Figure 11A:
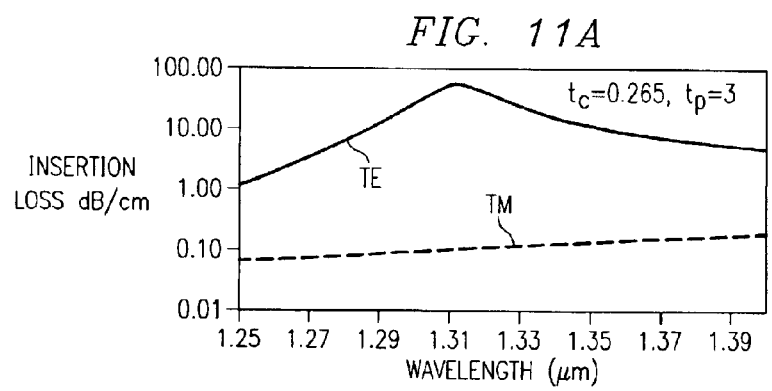
FIGS. 11A and 11B depict graphs illustrating the band stop characteristics of the fourth embodiment of the present invention.
Figure 11B:
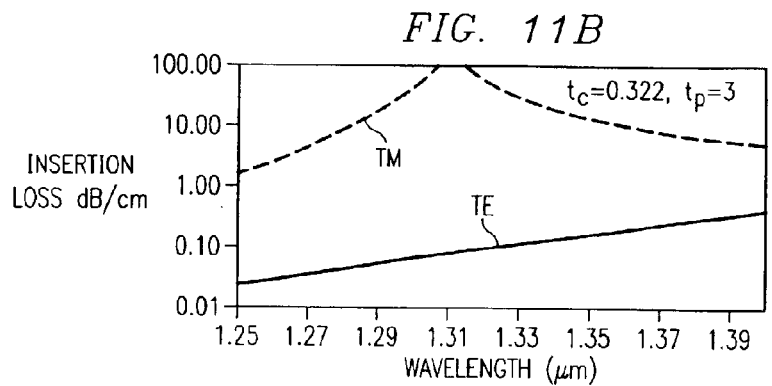

FIGS. 11A and 11B depict graphs illustrating the band stop characteristics of this embodiment of the present invention. In FIG. 11A a composite thickness of 0.265 μm and a p-clad thickness of 3 μm provides a TE loss of 80 dB/cm, with a TM loss of only 0.1 dB/cm, at the center wavelength of 1.31 μm. Thus, this is a filter for selecting the TM modes while rejecting the TE mode.

The results shown in FIG. 11B are for a composite thickness of 0.322 μm and p-clad thickness of 3 μm. Here the TM mode is stopped with a loss over 138 dB/cm and the TE mode is passed with less than 0.1 dB/cm of loss. In both cases a useful band centered on 1.31 is available. As can be seen, TM insertion loss over 50 dB/cm is available in the 20 nm band from 1.3 to 1.32 μm. The TE loss in this band is below 0.1 dB/cm. Thus, this is a filter for selecting the TE mode while rejecting the TM mode over a substantial bandwidth.

Figure 12:
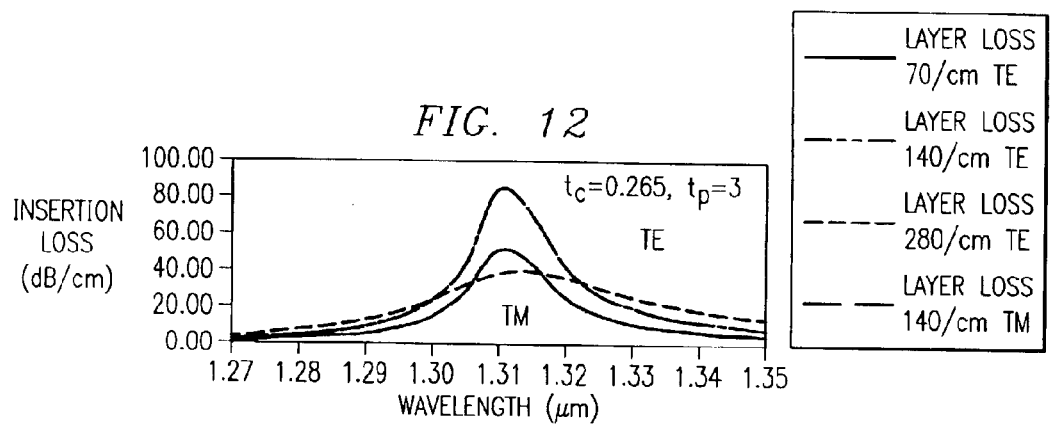
FIG. 12 depicts a graph illustrating the band-stop characteristics for the TM polarizer with three values of layer loss.

FIG. 12 depicts a graph illustrating the band-stop characteristics for the TM polarizer with three values of layer loss. Note that in this example the band-stop characteristic is highest and narrowest at layer loss □=140/cm and lowers and/or broadens at □=280 and 70/cm. This general behavior is found for both TE and TM polarizers for all embodiments.

The absorptive layer loss, □ should be chosen in the range 10 to 1,000/cm. The exact value may then be selected to give the desired band-stop width and height. Thus, for example, prior art devices that use metal films as the absorptive layers, have layer losses which are several orders of magnitude too large to gain the benefits of the present invention.

A fifth embodiment of the present invention is based on a multi-quantum-well waveguide such as might be used to make lasers or amplifiers for operation in the 0.9–1.0 μm region. Again, the waveguide is grown in the AlGaAs system. The absorptive layer is $Al_xGa_{1-x}As$. The aluminum fraction x=0.06 is chosen to give refractive index of 3.5 at λ=0.965 μm. The doping is chosen to give an absorption coefficient α=2×10², as is known in the art. The layer structure is shown in Table 5. The filter may be visualized using FIG. 1. The waveguide film consists of all the layers, from the Top $Al_{0.1}Ga_{0.9}As$ layer to the Bottom $Al_{0.1}Ga_{0.9}As$ layer. The Cover is the p-clad and the substrate is the substrate. The respective $t_c/h$ ratios are 1.51 (TE) and 1.50 (TM).

This filter can be made on the same substrate and in line with a laser or amplifier by adding the absorptive layer, after removing any conductive cap layers and contacts, and adjusting the p-clad thickness as needed.

TABLE 5

Center Wavelengths ? 0.965 μm

| Material | Loss α/cm | Refractive index, n | Thickness/μm |
|---|---|---|---|
| AIR | 0 | 1 | — |
| $Al_{0.06}Ga_{0.94}$ As, doping chosen to have indicated loss | 2 × 10² | 3.5 | $t_c$ = 0.254 h = 0.168 TE<br>$t_c$ = 0.282. h = 0.188 TM |
| p-clad $Al_{0.5}Ga_{0.5}As$ | 0 | 3.25609 | 1.1 |
| Top $Al_{0.1}Ga_{0.9}As$ | 0 | 3.47885 | 0.02 |
| BARRIER | 0 | 3.53499 | 0.0070 |
| QW | 0 | 3.67000 | 0.01500 |
| BARRIER | 0 | 3.53499 | 0.0070 |
| QW | 0 | 3.67000 | 0.01500 |
| BARRIER | 0 | 3.53499 | 0.0070 |
| QW | 0 | 3.67000 | 001500 |
| BARRIER | 0 | 3.53499 | 0.0070 |
| Bottom $Al_{0.1}Ga_{0.9}As$ | 0 | 3.47885 | 0.02 |
| Substrate $Al_{0.5}Ga_{0.5}As$ | 0 | 3.25609 | — |

Figure 13A:
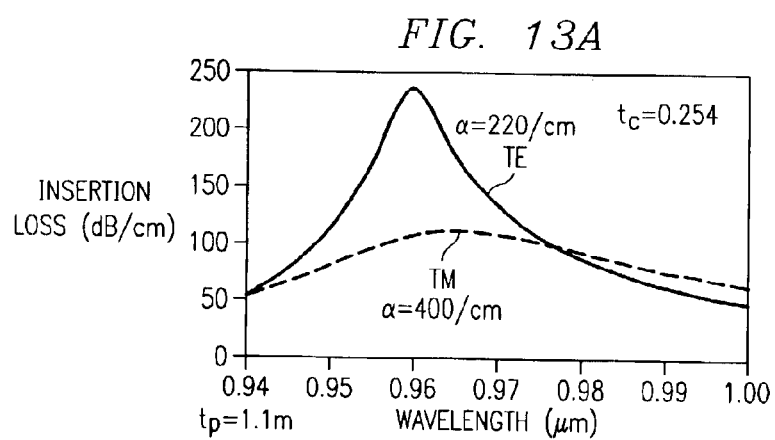
FIGS. 13A and 13B depict graphs illustrating the band stop characteristics of the fifth embodiment of the present invention.
Figure 13B:
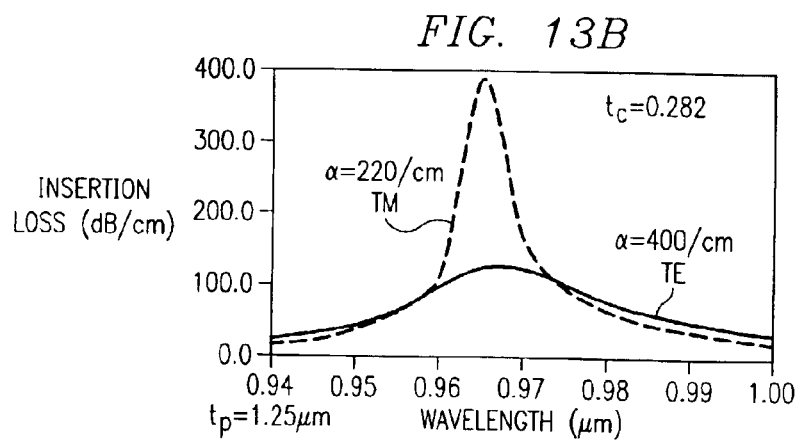

FIGS. 13A and 13B depict graphs illustrating the band stop characteristics of this embodiment of the present invention. In FIG. 13A, $t_c$=0.254 μm and $t_p$=1.1 μm, providing a TE loss over 110 dB/cm, with a TM loss less than 4 dB/cm, at the center wavelength of 1.31 μm. This is thus a filter for selecting the TM modes while rejecting the TE mode.

The results shown in FIG. 13B are for $t_c$=0.282 μm and $t_p$=1.25 μm. Here the TM mode is stopped with a loss over 125 dB/cm, and the TE mode is passed with less than 0.5 dB/cm of loss. In both cases a useful band centered on ≈0.965 μm is seen.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A light polarizer, comprising:
   an optical waveguide for guiding light having at least first and second polarization modes, wherein the second polarization mode is perpendicular to the first polarization mode; and
   an absorptive layer, for filtering a selected one of the first and second polarization modes while allowing the other of the first and second polarization modes to pass, wherein the selected polarization mode is determined by selecting a thickness, refractive index, absorptive loss, and location of the absorptive layer that is correct for the selected polarization mode.

2. The light polarizer according to claim 1, wherein the refractive index and thickness of the absorptive layer produce a secondary optical field peak in the absorptive layer.

3. The light polarizer according to claim 1, wherein the optical waveguide further comprises:
   a substrate;
   a cover layer, and
   at least one core layer between the substrate and cover layer.

4. The light polarizer according to claim 3, wherein the refractive index of the absorptive layer is at least equal to the refractive index of the cover layer.

5. The light polarizer according to claim 3, wherein the at least one core layer is composed of the same material as the absorptive layer.

6. The light polarizer according to claim 3, wherein the substrate and cover layer are composed of quartz, and the at least one core layer is composed of doped quartz.

7. The light polarizer according to claim 6, wherein the absorptive layer is composed of PMMA containing a dye.

8. The light polarizer according to claim 6, wherein the absorptive layer is composed of transparent plastic containing a dye.

9. The light polarizer according to claim 6, wherein the absorptive layer comprises a composite of metal particles suspended in host material.

10. The light polarizer according to claim 9, wherein the host material is PMMA.

11. The light polarizer according to claim 9, wherein the host material is a transparent plastic.

12. The light polarizer according to claim 9, wherein the metal particles are iron.

13. The light polarizer according to claim 3, wherein the absorptive layer is composed of the quaternary compound $Ga_{0.27}In_{0.73}As_{0.57}P_{0.43}$ grown on an InP cover layer.

14. The light polarizer according to claim 1, wherein the waveguide is grown in an AlGaInAs quaternary system and the absorptive layer is a composite of iron in a GaAs host.

15. The light polarizer according to claim 1, wherein the waveguide is grown in an AlGaInAs quaternary system and the absorptive layer is a composite of iron in a silicon host.

16. The light polarizer according to claim 1, wherein the waveguide is grown in an AlGaAs system and the absorptive layer is $Al_xGa_{1-x}As$.

17. The light polarizer according to claim 1, wherein the waveguide is grown in an AlGaAs system and the absorptive layer is a composite of iron in a GaAs host.

18. The light polarizer according to claim 1, wherein the waveguide is grown in an AlGaAs system and the absorptive layer is a composite of iron in a silicon host.

19. The light polarizer according to claim 1, wherein the first polarization mode comprises a TE polarization mode, the second polarization mode comprise a TM polarization mode, and wherein the selected polarization mode comprises the TE polarization mode.

20. The light polarizer according to claim 1, wherein the first polarization mode comprises a TE polarization mode, the second polarization mode comprises a TM polarization mode, and wherein the selected polarization mode comprises the TM polarization mode.

21. A method for polarizing light, comprising:
    guiding light having at least first and second polarization modes through an optical waveguide, wherein the second polarization mode is perpendicular to the first polarization mode;
    providing an absorptive layer for filtering one of the first and second polarization modes while allowing the other of the first and second polarization modes to pass; and
    selecting a thickness, refractive index, absorptive loss, and location of the absorptive layer that is correct to filter a selected one of the first and second polarization modes.

22. The method according to claim 21, wherein the first polarization mode comprises a TE polarization mode and the second polarization mode comprises a TM polarization mode, and wherein selecting a thickness, refractive index, absorptive loss, and location of the absorptive layer that is correct to filter a selected one of the first and second polarization modes comprises:
    selecting a thickness, refractive index, absorptive loss, and location of the absorptive layer that is correct to filter the TE polarization mode.

23. The method according to claim 21, wherein the first polarization mode comprises a TE polarization mode and the second polarization mode comprises a TM polarization mode, and wherein selecting a thickness, refractive index, absorptive loss, and location of the absorptive layer that is correct to filter a selected one of the first and second polarization modes comprises:
    selecting a thickness, refractive index, absorptive loss, and location of the absorptive layer that is correct to filter the TM polarization mode.

* * * * *